United States Patent

Hammond et al.

[11] Patent Number: 5,540,305
[45] Date of Patent: Jul. 30, 1996

[54] MULTI-DISC BRAKE

[75] Inventors: Charles P. Hammond, Leicester; Ian D. Sim, Hinckley; Steven Webb, Rugby, all of England

[73] Assignee: Dunlop Limited, London, England

[21] Appl. No.: 337,218

[22] Filed: Nov. 7, 1994

[30] Foreign Application Priority Data

Nov. 5, 1993 [GB] United Kingdom ............... 9322877

[51] Int. Cl.⁶ ................................... F16D 65/847
[52] U.S. Cl. ................. 188/71.5; 188/18 A; 188/264 G; 188/71.6; 188/367; 188/366
[58] Field of Search .................. 188/71.5, 71.6, 188/18 A, 18 R, 71.1, 72.4, 72.5, 366, 367, 264 G, 72.3, 264 R, 264 W, 218 R, 218 XL, 218 A

[56] References Cited

U.S. PATENT DOCUMENTS

| 2,017,715 | 10/1935 | Goodyear et al. | 188/264 G |
|---|---|---|---|
| 3,301,357 | 1/1967 | Cussons et al. | |
| 3,653,472 | 4/1972 | Dowell | 188/72.4 |
| 3,887,041 | 6/1975 | Malone | 188/264 G |
| 3,892,293 | 7/1975 | Dowell | 188/71.5 |
| 3,951,240 | 4/1976 | Dowell et al. | 188/71.5 |
| 3,958,833 | 5/1976 | Stanton | 188/71.5 |
| 4,147,241 | 4/1979 | Preniczny et al. | 188/264 G |
| 4,606,436 | 8/1986 | Mery et al. | 188/71.5 |
| 4,703,837 | 11/1987 | Guichard | 188/71.5 |
| 4,944,370 | 7/1990 | Chambers et al. | 188/71.5 |
| 5,062,503 | 11/1991 | Black et al. | 188/71.5 |

FOREIGN PATENT DOCUMENTS

| 0398274 | 11/1990 | European Pat. Off. |
| 1443709 | 7/1973 | United Kingdom . |
| 1490743 | 11/1977 | United Kingdom . |
| 2124658 | 2/1984 | United Kingdom . |
| 2174774 | 11/1986 | United Kingdom . |

Primary Examiner—Douglas C. Butler
Attorney, Agent, or Firm—Watson, Cole, Stevens, Davis, P.L.L.C.

[57] ABSTRACT

In a multi-disc brake comprising a torque tube and a piston housing having a plurality of hydraulically operated and circumferentially spaced piston cylinders a thermal isolation element is arranged to restrict heat generated by the friction discs from flowing from the torque tube to the piston housing.

20 Claims, 5 Drawing Sheets

MULTI-DISC BRAKE

BACKGROUND OF THE INVENTION

This invention relates to a multi-disc brake and in particular, though not exclusively, to a multi-disc brake for use in aircraft. The invention may be applied in, for example, a multi-disc brake of the type comprising friction discs of carbon-carbon composite material or in a brake of the so-called steel type in which steel discs each carry elements of wear-resistant friction material.

An example of a known aircraft disc brake assembly of a multi-steel type is as shown in the accompanying FIGS. 1 and 2 in which FIG. 1 is a sectional elevation of half a brake assembly, in a plane parallel to and coincident with the axis X—X about which the brake assembly is symmetrical, and FIG. 2 is an end elevation of the brake assembly shown in FIG. 1, the left hand half being a section on Y—Y to show the brake assembly with the brake actuators removed.

The disc brake is of the steel type and comprises a non-rotatable annular hub 1 having secured thereto a torque tube 2 by means of bolts 2'. An assembly of annular stator disc members 3,3a,3b are axially slidably keyed, each at its radially inner periphery, to splines 4 on the torque tube 2. A corresponding series of annular rotor disc members 5 are interleaved with the stator members 3 and axially slidably keyed, each at its radially outer periphery 6, to a wheel (not shown) for rotation therewith.

At one, a distal, end of the torque tube 2 an annular flange 7 is secured thereto by bolts 8 for engagement with the axially outermost stator member 3a, to constitute a stop for that stator member.

Twelve brake actuators 9 in the form of hydraulic piston and cylinder assemblies are mounted at equally circumferentially spaced positions at the other end of the torque tube 2 for applying a brake-actuating thrust to the axially innermost stator member 3b. The piston and cylinder assemblies 9 are circumferentially interconnected by a piston housing in the form of an integral flange member 9' which in turn is formed integrally with the aforedescribed annular hub 1.

Thrust transmission means 10 for transmitting thrust from the actuators to the axially innermost stator member 3b comprises first and second concentric and axially spaced metal annuli (11,12) interconnected by a deformable first connecting means 13 in the form of a frusto-conical metal web. The piston 14 of each piston and cylinder assembly 9 is arranged to engage the first annulus 11 to transmit brake applying thrust thereto. A thermal insulation element may be provided between the stator 3b and the pistons 14.

In the aforedescribed construction the circumferentially spaced series of bolts 2' are relied upon to ensure that the torque tube 2 remains secured relative to the annular hub 1 against the separating force arising when the piston and cylinder assemblies 9 are pressurised to apply axial compression to the stack of discs and cause friction to be generated upon relative rotational movement of the rotor and stator discs. To avoid damage and to maintain integrity of operation the bolts 2' are pre-stressed such that under maximum axial load imposed by the piston and cylinder assemblies the bolts ensure that the end of the torque tube 2 remains firmly abutting against the annular hub 1.

It has long been recognised that heat build-up in aircraft brakes of the aforedescribed type can be a major problem and that excessive flow of heat to the wheels, piston housing, hydraulic piston and cylinder assemblies and their associated hydraulic operating systems must be prevented.

Attempts to prevent an excessive flow of heat from the friction discs have included the use of induced air cooling, as described in U.S. Pat. No. 3,301,357 and the use of special load bearing thermal insulators provided at the operating faces of the actuating pistons as described in UK Patent 2124658. While these prior proposals can lead to beneficial affects, the continually increasing thermal demands imposed on modern aircraft brakes make highly desirable the provision of further means for controlling heat transfer from the friction discs.

An object of the present invention is to provide a multi-disc brake having improved means for restricting the flow of heat from the discs to the piston housing of the piston and cylinder assemblies.

In accordance with one of its aspects the present invention provides a multi-disc brake of the kind comprising a torque tube end a piston housing which comprises a plurality of circumferentially spaced piston cylinders each to contain a hydraulically operated piston wherein a thermal isolation element is provided and arranged to restrict heat generated by the friction discs and conducted to the torque tube from flowing from the torque tube to the piston housing.

The present invention provides also a method in which, in a multi-disc brake of the kind comprising a torque tube end a piston housing which comprises a plurality of circumferentially spaced piston cylinders each to contain a hydraulically operated piston, the flow from the torque tube to the piston housing of heat generated by the friction discs and conducted to the torque tube is restricted by provision of an interposed thermal isolation element.

The thermal isolation element preferably comprises a material which behaves in a substantially elastic manner at its service temperature; it may comprise a material having a glass transition temperature (Tg) which is above the service temperature of the element. Therefore, because the material is at a temperature below its Tg, it will have a low hysteresis lose in service. Preferably the element has a modulus of elasticity of more than 2,000 MPa. Preferably the material of the thermal isolation element has a thermal conductivity of less than 2 W/m.k, more preferably less than 0.5 W/m.k. The element may, for example, be a high temperature polymer material such as a polyimide which may be either unfilled or graphite-filled.

The present invention teaches that the thermal isolation element may be provided at the interface between an end of the torque tube and the face of an annular hub to which the torque tube is bolted. The thermal isolation element thereby acts to restrict the flow of heat from the disc stack to the annular hub to which, conventionally, the piston housing is secured or integrally formed.

However, the present invention teaches also that advantageously a piston housing comprising a plurality of circumferentially spaced piston cylinders is not formed integrally with the annular hub and ie separated therefrom by said thermal isolation element interposed therebetween. More preferably the piston housing is arranged to be axially slidable, for example on the torque tube or, more advantageously, on an intermediate support member. Said intermediate support member may be secured directly to the torque tube and/or to the annular hub. It may be formed of a material having a lower thermal conductivity than the material of the torque tube and/or hub.

Preferably the intermediate support member has an end abutment in the form of an axial end stop towards which the piston housing is urged when the hydraulic piston and cylinder assemblies are actuated to apply axial compression to the stack of discs. An element of thermal insulation material preferably is incorporated between the piston housing and said end abutment.

Preferably bias means is provided normally to urge the piston housing away from the end abutment. The bias means may be comprised by one or more metallic springs. One or more fastener devices may be provided to prevent undue axial movement of the piston housing away from the end abutment member under the action of the bias means.

The intermediate support member and/or the torque tube may be provided with spline formations positioned to engage complementary shape formations at an inner periphery of an annular piston housing thereby to restrain rotational movement of the piston housing relative to the hub of the brake. In an arrangement in which the piston housing does not need to react the torque loads arising during operation of the brake, the splines and/or inner periphery of the piston housing may be formed of a material selected primarily on the basis of low thermal conductivity properties in contrast to the strength properties required for the torque tube splines that interengage with the stator discs.

While the intermediate support member may be a separate component mounted on the end of the torque tube, it may alternatively be formed as an integral part of the torque tube. If the piston housing is mounted on an integral torque tube, depending on the space available, the inner periphery of the piston housing may either be slotted and mounted directly on the tube or the inner diameter of the piston housing may be greater than the outside diameter of the splines thereby to ensure that there is no direct contact between the bore of the piston housing and the torque tube.

Typically torque tubes are manufactured from heat-resistant materials such as Ni-Cr-Mo steel or titanium alloy having thermal conductivities (cal/cm-sec-°C.) of 0.09 to 0.2 respectively. However, in practice the use of titanium alloys is limited because of the risk of corrosion if phosphate ester hydraulic fluids are present. If the intermediate support member is a separate component from the main torque tube, the torque tube may be manufactured e.g. from alloy steel and the intermediate support member may be manufactured from a material of a lower thermal conductivity such as austenitic stainless steel or nickel alloy typically having coefficients of thermal conductivity (cal/cm-sec-°C.) of 0.035 to 0.03 respectively.

BRIEF DESCRIPTION OF THE DRAWINGS

These and other aspects of the present invention are now described, by way of example only, with reference to the accompanying diagrammatic drawings in which.

DETAILED DESCRIPTION OF A PREFERRED EMBODIMENT

Figure 1:
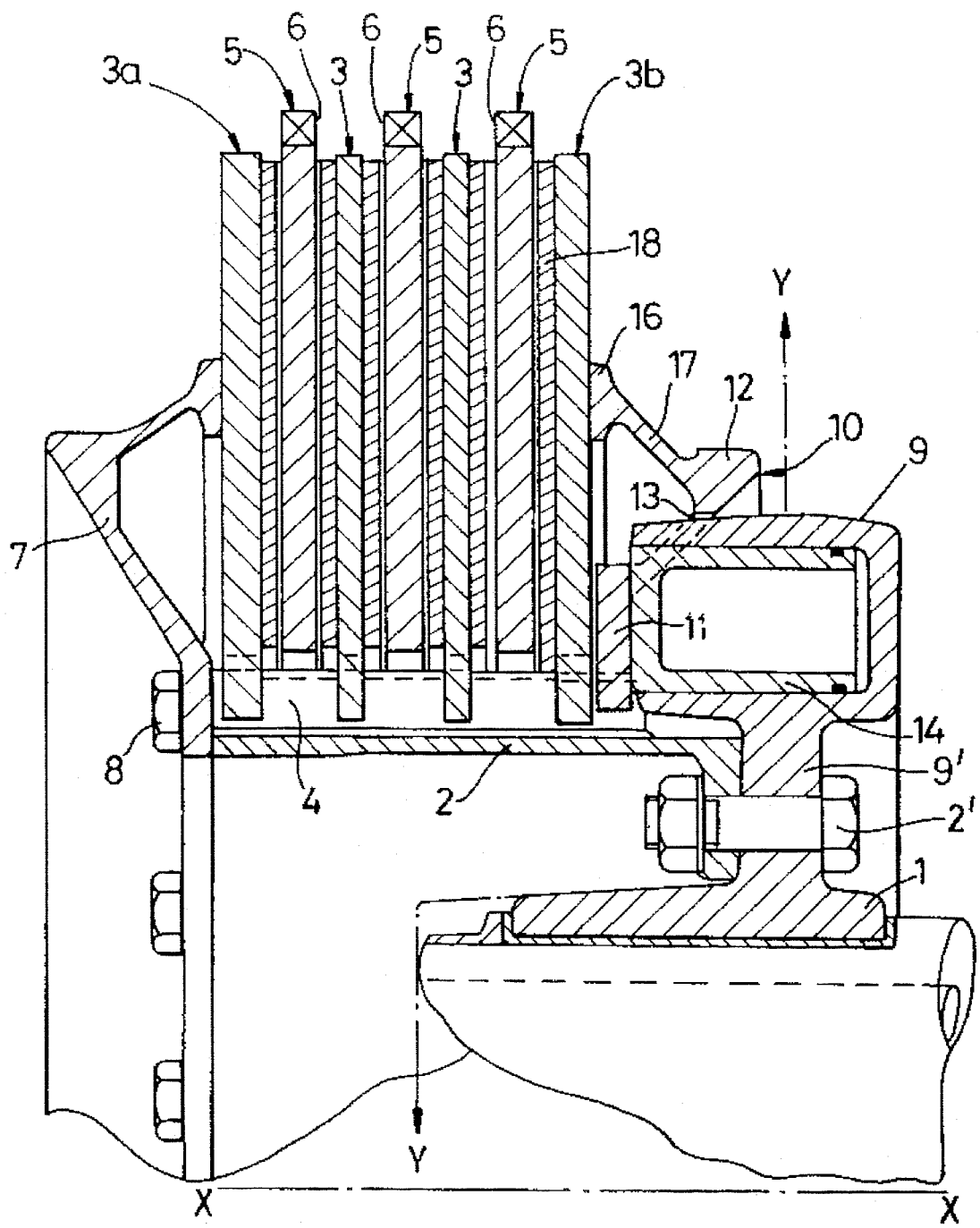
FIG. 1 is a longitudinal cross section of part of a multi-disc brake assembly according to the prior art.
Figure 2:
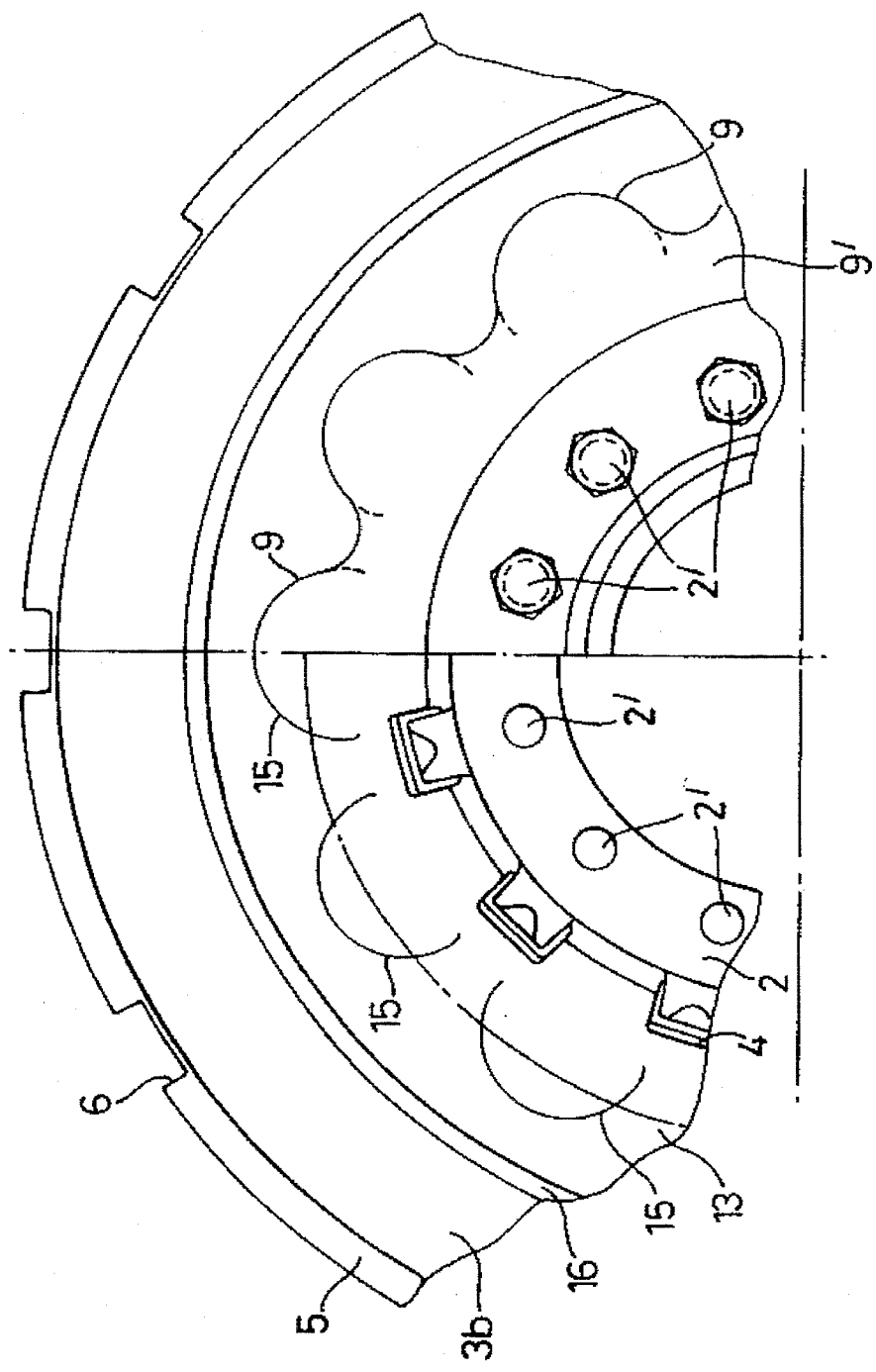
FIG. 2 is a sectional view along line Y—Y of FIG. 1
Figure 3:
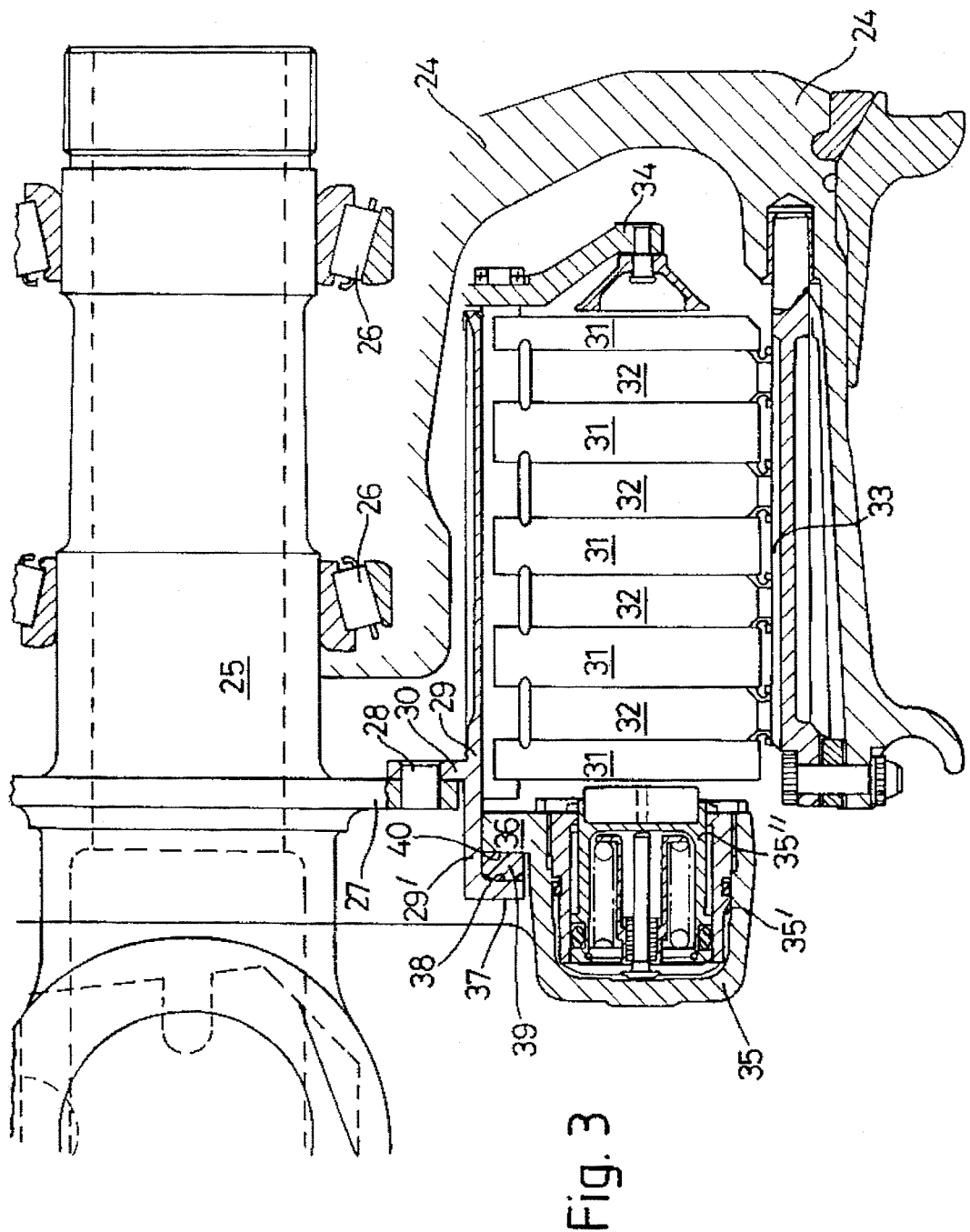
FIG. 3 is a longitudinal cross-sectional view of part of a multi-disc brake assembly in accordance with a first embodiment of the present invention.

The multi-disk brake shown in FIG. 3 comprises a central axle 25 about which a wheel 24 is rotatably mounted by bearings 26.

A hub flange 27 is formed integral with the axle 25 and has bolted thereto by bolts 28 a torque tube 29. The torque tube 29 has an inwardly extending flange 30 near to one of its axial ends to facilitate said bolted flanged interconnection with the hub 27.

The torque tube 29 has a splined outer surface on which a plurality of stator discs 31 are axially slidably mounted.

A series of rotor discs 32 are axially slidably mounted on an internally splined region 33 of the wheel 24, the rotor discs lying in conventional manner interposed between the stator discs 31 and the assembly of discs lying in a stack between an annular end flange 34 and a piston housing 35.

The piston housing 35 is of annular form and comprises a plurality of uniformly circumferentially spaced piston cylinders 35' each containing a hydraulically actuable piston 35" the operating face of which is arranged to apply pressure to an end stator 31. The piston housing is mounted on an axial end portion of the torque tube lying between the flange region 30 and the end 29' of the torque tube furthest from the annular end flange 34.

The piston housing has a radially inwardly extending flange region 36 which is held captive around the torque tube by a radially outwardly extending flange 37 provided at the end of the torque tube which thereby serves as an integral intermediate support member for the piston housing. The outwardly extending flange 37 of the torque tube acts as an end stop abutment member for the piston housing 35. To facilitate assembly of the brake, the piston housing flange 36 is slotted so that it may be slid into position over the splines which extend around the outer surface of the torque tube 29 over a major part of the axial length of that torque tube, i e between the distal end that supports the annular end flange 34 and an axial position aligned substantially with the inwardly extending flange 30.

In operation of the brake assembly, application of hydraulic pressure to the piston and cylinders will cause the piston housing 35 to be driven towards a torque tube abutment face 38 of the end stop 37, i e to the left as viewed in FIG. 3. The brake actuation reaction force will either be transmitted to the abutment face 38 directly by the piston housing or, as illustrated, via an interposed multi-functional intermediate component 39.

The intermediate component 39 comprises a ring of material of low thermal conductivity and good friction and wear characteristics thereby to both impede the conduction of heat and prevent fretting occurring between the torque tube abutment 38 and the piston housing 36. A suitable material for the intermediate component 39 is high temperature plastic such as polyimide, either unfilled or graphite filled. The piston housing 35, abutment stop 37 and optionally the intermediate component 39 are clamped together only when brake actuating force is applied. In consequence the need for a pre-stressed interface in the heat flow path between the piston housing and torque tube is eliminated.

The abutment face 38 and/or the confronting piston housing face 40 may have a thermal insulating layer or coating such as sprayed zirconia which may be ground to provide the necessary tribological characteristics.

Figure 4:
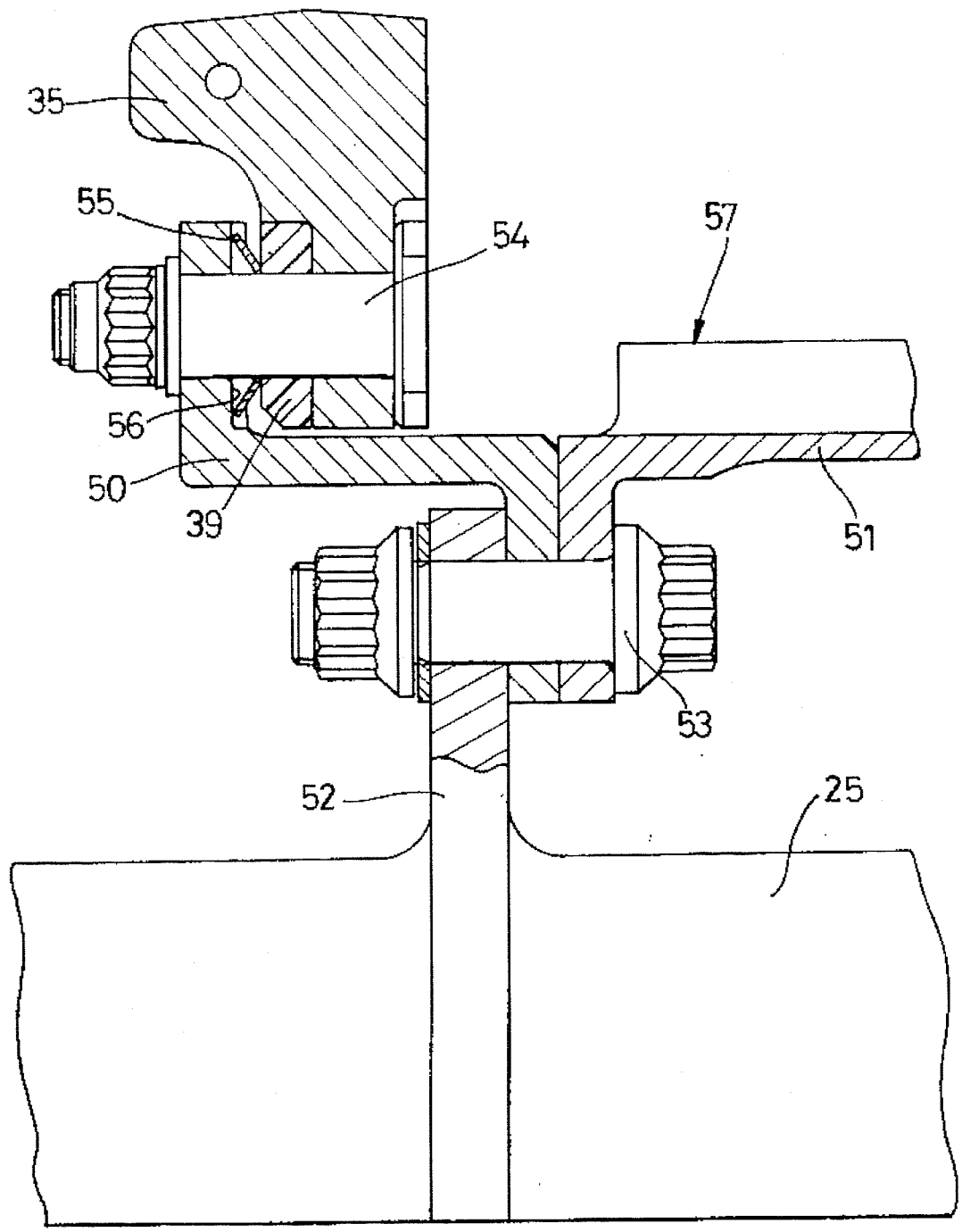
FIG. 4 is a longitudinal cross-sectional view of part of a brake assembly in accordance with another embodiment.

FIG. 4 shows a modified construction in which the intermediate support member is not integral with the torque tube. It is in the form of an abutment component 50 formed separate from the torque tube 51. The component 50 and torque tube 51 are bolted together and to a hub flange 52 by means of a series of circumferentially spaced bolts 53. In this construction the bolts 53, in contrast to the corresponding bolts 28' shown in FIG. 3, require to be of a high strength capacity and to be pre-stressed to avoid any tendency for axial separation of the torque tube 51 and abutment component 50.

In the FIG. 4 construction the piston housing 35 and abutment member 50 are maintained in a controlled axial alignment and restricted spacing by means of at least one spring loaded fastener 54. The fastener 54 incorporates an elastically deformable device in the form of a metal belville washer 55 which surrounds the bolt-like fastener 54. The washer 55 urges the piston housing 35 in a direction axially away from the end face 56 of the abutment component 50. Thus when brake actuating force is released the washer(s) operates to diminish the heat transfer path between the stack of discs and the piston housing 35.

If the torque tube 51 is attached to the axle of the aircraft undercarriage so that rotation of the torque tube is prevented, the piston housing 35 does not need to provide reaction to the brake torque loads. In that case the fastener 54 similarly does not have to react the brake actuating forces but merely to maintain the piston housing 35 and abutment component 50 in controlled axial alignment when the brake is not in use. Thus the fastener(s) 54 can be of relatively small size and strength. However, in an alternative use of the brake assembly in which torque loads are transmitted to the aircraft undercarriage via a torque link and torque lug (not shown) on the piston housing 35 it will be necessary to provide a plurality of the fasteners 54 each capable of carrying torque loads generated during braking action. In this configuration there is no direct, bolted connection between the torque tube 51 and the aircraft undercarriage.

Optionally an element (not shown) of low thermal conductivity material may be provided between the confronting surfaces of the abutment component 50 and the torque tube 51 to reduce flow of heat from the torque tube.

Figure 5:
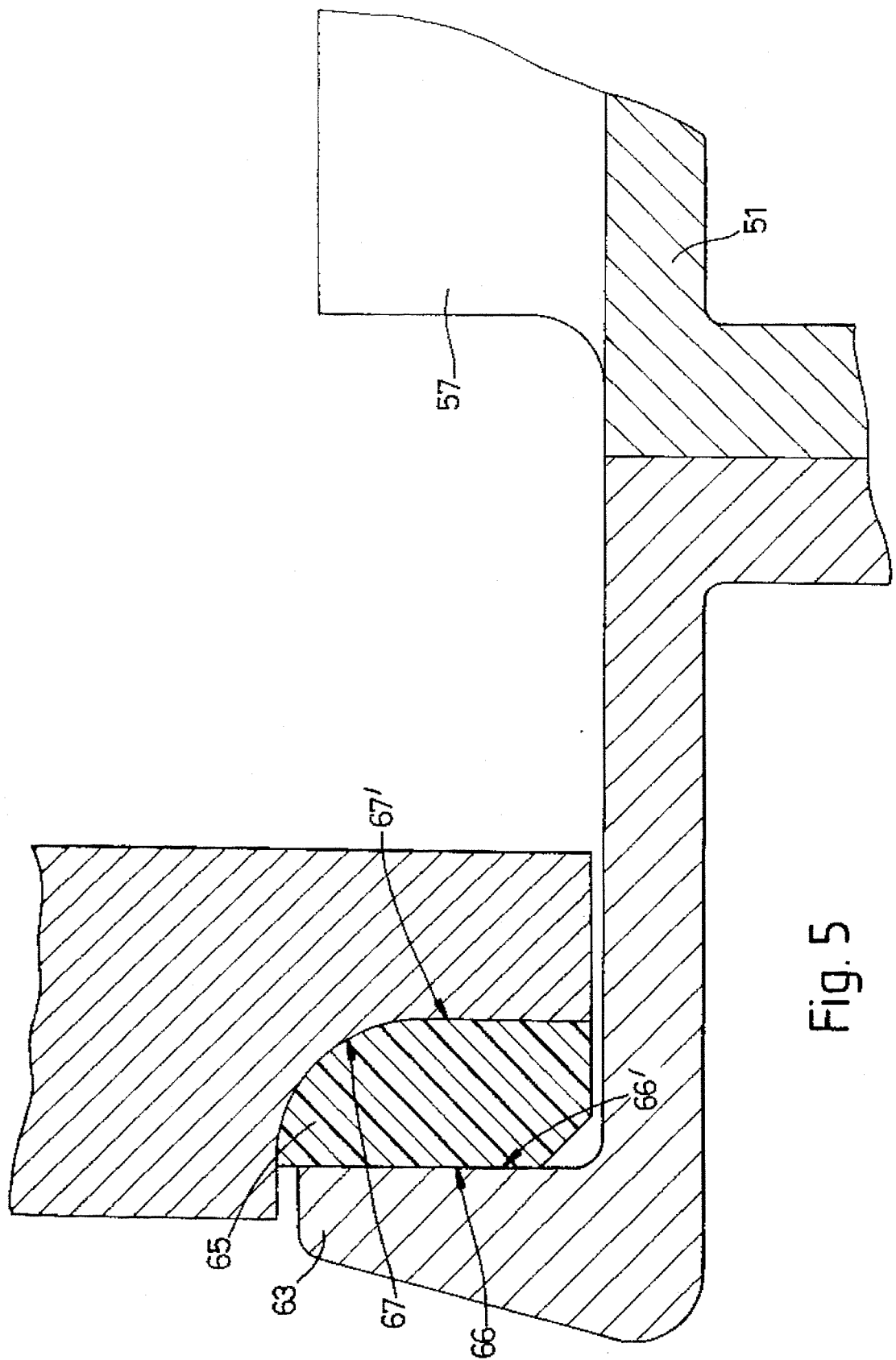
FIG. 5 is a longitudinal cross-section of a modified form of the embodiment of FIG. 4.

FIG. 5 shows a variation of the FIG. 4 construction in which a thermal insulation component 65 is selectively profiled at faces 66,67 to maintain a substantially uniformly distributed load of the components as the brake actuation forces increase from zero to a maximum notwithstanding that the abutment flange 63 necessarily will deflect in response to increase of brake actuation load. The profiling, as schematically illustrated, is selected to achieve at least in part a ball and socket type pivotal movement thereby to provide a self-aligning or "mini articulation" capability.

In the FIGS. 4 and 5 configurations the radially inner edge of the annular piston housing 35 may be of cylindrical form dimensioned to fit, preferably with a small clearance, about the radially outer surface of the cylindrical body portion of the abutment component 50. That is, the piston housing needs to be size sufficient only for fitting around the abutment component prior to that being bolted relative to the torque tube and it does not need to be shaped and sized for fitting over the splines 57 of the torque tube 51.

It is to be understood that in the aforedescribed examples low conductivity material may be provided in a conventional manner between the brake actuating pistons and the confronting end stator disc.

We claim:

1. A multi-disc brake comprising an axially arranged disc pack of a plurality of interleaved generally annular rotor and stator discs for effecting braking therebetween and accompanied by consequent heat generation when said disk pack is axially compressed, means for axially compressing said disc pack comprising a piston housing carrying a plurality of circumferentially spaced pistons at one axial end of said disc pack and a reaction member at the other axial end of said disc pack, a torque tube at least partially extending through said disk pack and having means at one end for mounting said piston housing so as to permit a limited degree of axial movement of said piston housing away from the reaction member upon axial compression of the disc pack;

said mounting means having a first abutment face confronting a second abutment face on said piston housing with a space between said abutment faces which decreases upon said axial compression, a thermal isolation element in said space which is positioned to be compressed upon said limited degree of axial movement, said thermal isolation element comprising a material which behaves in a substantially elastic manner at its service temperature so as to return substantially to an uncompressed size when said axial compression is released, the arrangement being such as to limit transfer of said heat from said torque tube to said piston housing.

2. A multi-disc brake in accordance with claim 1 and comprising at least one fastener device to prevent undue axial movement of the piston housing away from the first abutment member.

3. A multi-disc brake in accordance with claim 1 wherein the torque tube is bolted to an annular hub and a thermal isolation element is provided at the interface between said tube and said hub.

4. A multi-disc brake according to claim 1 including a biasing means which normally urges the piston housing away from the first abutment face.

5. A multi-disc brake in accordance with claim 4 wherein said biasing means comprises at least one metallic spring.

6. A multi-disc brake comprising an axially arranged disc pack of a plurality of interleaved generally annular rotor and stator discs for effecting braking therebetween and accompanied by consequent heat generation when said disc pack is axially compressed, means for axially compressing said disc pack comprising a piston housing carrying a plurality of circumferentially spaced pistons at one axial end of said disc pack and a reaction member at the other axial end of said disc pack, a torque tube at least partially extending through said disc pack; connecting means at an end region of the torque tube for transmitting axial loads between said piston housing and said torque tube; said connecting means comprising a first abutment face associated with the torque tube, a confronting second abutment face associated with the piston housing and said first and second abutment faces being axially spaced thereby to provide an annular space therebetween;

a thermal isolation element located in said space, said thermal isolation element comprising a material having a thermal conductivity of less than 2 W/m.K and a modulus of elasticity of more than 2000 MPa which behaves in a substantially elastic manner at its service temperature, the arrangement being such as to limit transfer of said heat from said torque tube to said piston housing.

7. A multi-disc brake according to claim 6, wherein the space between said abutment faces decreases upon said axial compression.

8. A multi-disc brake according to claim 6, wherein the space between said abutment faces is unchanged upon said axial compression.

9. A multi-disc brake according to claim 6 including a biasing means which normally urges the piston housing away from the first abutment face.

10. A multi-disc brake comprising an axially arranged disc pack of a plurality of interleaved generally annular rotor and stator discs for effecting braking therebetween and accompanied by consequent heat generation when said disc pack is axially compressed, means for axially compressing said disc pack comprising a piston housing carrying a plurality of circumferentially spaced pistons at one axial end of said disc pack and a reaction member at the other axial end of said disc pack, a torque tube at least partially extending through said disc pack; connecting means at an end region of the torque tube to enable axial loads to be transmitted between said piston housing and said torque tube, said connecting means comprising at least one pair of confronting abutment faces and at least one pair of said faces being axially spaced thereby to provide an annular space therebetween, one abutment face within said connecting means being associated with the torque tube and another abutment face within said connecting means being associated with the piston housing, and a thermal isolation element located in said space, said thermal isolation element comprising a material having a thermal conductivity of less than 2 W/m.K and a modulus of elasticity of more than 2000 MPa which behaves in a substantially elastic manner at its service temperature, the arrangement being such as to limit transfer of said heat from said torque tube to said piston housing.

11. A multi-disc brake according to claim 10, wherein said annular space decreases upon said axial compression.

12. A multi-disc brake according to claim 10, wherein the said annular space is axially filled by said thermal isolation element.

13. A multi-disc brake according to claim 10, wherein the said connecting means comprises an intermediate support member.

14. A multi-disc brake in accordance with claim 13 wherein at least one of the intermediate support member and the torque tube is provided with spline formations to engage complementary formations at an inner periphery of an annular piston housing thereby to restrain relative rotational movement between the piston housing and an annular hub of the brake.

15. A multi-disc brake in accordance with claim 14 and wherein the piston housing is arranged not to react substantive torque loads arising during brake operation.

16. A multi-disc brake in accordance with claim 15 wherein at least one of said splines and the inner periphery of the piston housing is formed of a material having a low thermal conductivity.

17. A multi-disc brake in accordance with claim 13 wherein the intermediate support member is an integral part of the torque tube.

18. A multi-disc brake in accordance with claim 17 wherein the inner periphery of the piston housing is slotted and mounted directly over the torque tube.

19. A multi-disc brake in accordance with claim 17 wherein the inner diameter of the piston housing is greater than the outside diameter of the splines.

20. A multi-disc brake according to claim 10 including a biasing means which normally urges the piston housing away from the first abutment face.

* * * * *